US009643516B2

(12) United States Patent
Hirota

(10) Patent No.: US 9,643,516 B2
(45) Date of Patent: May 9, 2017

(54) VEHICLE DRIVE BATTERY ATTACHMENT STRUCTURE

(71) Applicant: Toyota Jidosha Kabushiki Kaisha, Toyota-shi Aichi-ken (JP)

(72) Inventor: Akihiro Hirota, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 14/867,274

(22) Filed: Sep. 28, 2015

(65) Prior Publication Data

US 2016/0090003 A1 Mar. 31, 2016

(30) Foreign Application Priority Data

Sep. 30, 2014 (JP) ................................ 2014-202095

(51) Int. Cl.
*B60L 11/18* (2006.01)
*B60K 1/04* (2006.01)

(52) U.S. Cl.
CPC ................................ *B60L 11/1877* (2013.01)

(58) Field of Classification Search
CPC .............. B60L 11/1877; B60L 11/1879; B60L 11/1896; B60L 11/1898; B60K 1/04; B60K 2001/0405; B60K 2001/0416; B60K 2001/045
See application file for complete search history.

(56) References Cited

U.S. PATENT DOCUMENTS

| 2002/0157886 | A1 | 10/2002 | Iwase | |
|---|---|---|---|---|
| 2004/0101745 | A1* | 5/2004 | Kawasaki | B60K 1/04 429/96 |
| 2007/0215399 | A1 | 9/2007 | Watanabe et al. | |
| 2009/0022206 | A1* | 1/2009 | Shibuya | B60K 1/04 374/208 |
| 2009/0166116 | A1 | 7/2009 | Kiya et al. | |
| 2010/0101885 | A1* | 4/2010 | Nozaki | B60K 1/00 180/232 |
| 2010/0170736 | A1 | 7/2010 | Watanabe et al. | |
| 2010/0289295 | A1* | 11/2010 | Yoda | B60K 1/04 296/187.03 |

(Continued)

FOREIGN PATENT DOCUMENTS

| JP | 2001-097149 A | 4/2001 |
|---|---|---|
| JP | 2001-341567 A | 12/2001 |

(Continued)

*Primary Examiner* — Frank Vanaman
(74) *Attorney, Agent, or Firm* — Dinsmore & Shohl LLP

(57) ABSTRACT

A vehicle drive battery attachment structure including a battery case disposed at the vehicle rear of a vehicle cabin, a rear side member that is provided at a side portion of a vehicle body rear section and extends along a vehicle front-rear direction, and a bracket that is fixed to the battery case, that includes a low strength portion and a high strength portion in a row along the vehicle front-rear direction, that is fixed to the rear side member at both vehicle front-rear direction end sides of the low strength portion and the high strength portion respectively, and in which the low strength portion is set with lower strength with respect to vehicle front-rear direction load than the high strength portion.

7 Claims, 6 Drawing Sheets

(56) References Cited

U.S. PATENT DOCUMENTS

| | | | | |
|---|---|---|---|---|
| 2011/0284299 | A1* | 11/2011 | Takahashi | B60K 1/04 |
| | | | | 180/65.21 |
| 2012/0112527 | A1* | 5/2012 | Kroulik | B60L 3/0046 |
| | | | | 307/9.1 |
| 2013/0126255 | A1 | 5/2013 | Saeki | |
| 2013/0161106 | A1* | 6/2013 | Iwai | B60K 1/04 |
| | | | | 180/68.5 |
| 2014/0008137 | A1 | 1/2014 | Shiromura et al. | |

FOREIGN PATENT DOCUMENTS

| | | |
|---|---|---|
| JP | 2005-247063 A | 9/2005 |
| JP | 2007-253933 A | 10/2007 |
| JP | 2008-307992 A | 12/2008 |
| JP | 2013-035435 A | 2/2013 |
| JP | 2013-103635 A | 5/2013 |
| JP | 2013-107541 A | 6/2013 |
| JP | 2014-015061 A | 1/2014 |

* cited by examiner

VEHICLE DRIVE BATTERY ATTACHMENT STRUCTURE

CROSS-REFERENCE TO RELATED APPLICATION

This application claims priority under 35 USC 119 from Japanese Patent application No. 2014-202095 filed Sep. 30, 2014, the disclosure of which is incorporated by reference herein.

BACKGROUND

Technical Field

Technology disclosed herein relates to an attachment structure for a vehicle drive battery.

Related Art

In an attachment structure for a battery mechanism described in Japanese Patent Application Laid-Open (JP-A) No. 2005-247063, a pair of left and right side members (rear side members) provided at a rear section of a vehicle respectively include upward curving kick-up sections, and front portions of the left and right kick-up sections are coupled together by a cross member. A front portion of a battery pack is fixed to the cross member by a front portion bracket. A rear portion of the battery pack is fixed to upper faces of the side members at rear portions of the kick-up sections by a bridge provided to couple the left and right side members together.

In the battery mechanism attachment structure configured as described above, when the vehicle is involved in a collision from behind (referred to below as a rear-end collision), the kick-up sections deform upward when the side members are input with load along a vehicle front-rear direction, and the rear portion of the battery pack moves upward relative to the kick-up sections. This suppresses transmission of collision load to the battery pack, suppressing damage to the battery pack.

Note that in what are known as plug-in hybrid vehicles and the like, sometimes a high capacity battery is installed in a luggage area at the vehicle rear of the vehicle cabin. Such batteries are, for example, set with large dimensions in the vehicle front-rear direction, and are disposed over a broad region from the vicinity of a front end portion to the vicinity of a rear end portion of the luggage area. When such a battery is fixed to left and right rear side members, the left and right rear side members deform less readily in a rear-end collision, and crash stroke could conceivably be insufficient. It is also conceivable that a deformation amount of the vehicle cabin could increase were such a battery to undergo heavy displacement toward the vehicle front side with respect to the vehicle body due to collision load.

SUMMARY

An object of an exemplary embodiment of the present invention is to obtain a vehicle drive battery attachment structure that contributes to securing crash stroke and reducing the deformation amount of a vehicle cabin in a rear-end collision, even when a battery disposed at the vehicle rear of the vehicle cabin has a large dimension in the vehicle front-rear direction.

Solution to Problem

A vehicle drive battery attachment structure according to a first aspect of the present invention includes: a battery case disposed at a the vehicle rear of a vehicle cabin; a rear side member that is provided at a side portion of a vehicle body rear section and that extends along a vehicle front-rear direction; and a bracket that is fixed to the battery case, that includes a low strength portion and a high strength portion in a row along the vehicle front-rear direction, that is fixed to the rear side member at both vehicle front-rear direction end sides of the low strength portion and the high strength portion, respectively, and in which the low strength portion is set with lower strength with respect to a vehicle front-rear direction load than the high strength portion.

In the vehicle drive battery attachment structure according to the first aspect of the present invention, a battery for driving the vehicle is disposed at the vehicle rear of the vehicle cabin. In cases in which the battery is set with large dimensions in the vehicle front-rear direction, in a rear-end collision, not only is collision load input to the rear side member, but collision load is sometimes also input directly to the battery. In such cases, some of the collision load input to the battery is transmitted to the rear side member through the high strength portion provided to the bracket. This thereby enables a reduction in the input to the battery. When the low strength portion provided to the bracket deforms due to the input to the battery, the rear side member readily deforms in the vehicle front-rear direction at a vehicle front-rear direction section where the low strength portion is disposed. The rear side member can accordingly be deformed (crushed) in the vehicle front-rear direction at this section, thus contributing to securing crash stroke. Moreover, the high strength portion can suppress displacement of the battery toward the vehicle front side with respect to the vehicle body, thus contributing to a reduction in the deformation amount of the vehicle body.

A vehicle drive battery attachment structure according to a second aspect of the present invention is the first aspect of the present invention, wherein in the vehicle front-rear direction, the rear side member deforms more readily under a vehicle front-rear direction load at a location positioned in a section where the low strength portion is disposed than at a location positioned in a section where the high strength portion is disposed.

In the vehicle drive battery attachment structure according to the second aspect of the present invention, the above configuration enables efficient deformation of the rear side member in the section where the low strength portion is disposed when the low strength portion of the bracket undergoes deformation.

A vehicle drive battery attachment structure according to a third aspect of the present invention is the first aspect or the second aspect of the present invention, wherein the bracket includes the high strength portion disposed to the vehicle rear of the low strength portion.

In the vehicle drive battery attachment structure according to the third aspect of the present invention, the above configuration enables collision load transmitted through the high strength portion of the bracket to the rear side member to be utilized in deformation of the rear side member at the vehicle front-rear direction section where the low strength portion is disposed. This thereby enables efficient deformation of the rear side member.

A vehicle drive battery attachment structure according to a fourth aspect of the present invention is any one of the first aspect to the third aspect of the present invention, wherein the bracket is set with a smaller vehicle front-rear direction dimension than the battery, and is disposed toward a rear end portion of the battery.

In the vehicle drive battery attachment structure according to the fourth aspect of the present invention, setting the dimensions of the bracket as above enables an increase in weight to be suppressed. Moreover, since the bracket is disposed toward the rear end portion of the battery as described above, both the section where rear collision load input to the rear end portion of the battery is transmitted through the high strength portion of the bracket to the rear side member, and the section where the rear side member is deformed together with the low strength portion, can be set further toward the rear side of the vehicle (at a side further away from the vehicle cabin).

A vehicle drive battery attachment structure according to a fifth aspect of the present invention is any one of the first aspect to the fourth aspect of the present invention, wherein the low strength portion is set with a larger vehicle front-rear direction dimension than the high strength portion.

In the vehicle drive battery attachment structure according to the fifth aspect of the present invention, the above configuration enables the section where the rear side member does not readily deform to be made smaller, and enables the section where the rear side member deforms readily to be made larger. This contributes to increasing the crash stroke.

In the vehicle drive battery attachment structure according to the sixth aspect of the present invention is the first aspect of the present invention, wherein the low strength portion includes bent portions that function as deformation origin portions that deform by stress generated when a vehicle front-rear direction load acts on the bracket.

In the vehicle drive battery attachment structure according to the seventh aspect of the present invention is the first aspect of the present invention, wherein the low strength portion includes holes, cutaways, grooves, notches or ridges that function as deformation origin portions that deform by stress generated when a vehicle front-rear direction load acts on the bracket.

In the vehicle drive battery attachment structure according to the eighth aspect of the present invention is the first aspect of the present invention, wherein: deformation stroke of the bracket along vehicle front-rear direction in a rear-end collision of the vehicle is set equivalent to a vehicle front-rear direction dimension of a gap between the battery and a rear seatback, or lower.

According to an exemplary embodiment of the present invention, a contribution is made to securing crash stroke and reducing the deformation amount of the vehicle cabin in a rear-end collision, even when the battery disposed at the vehicle rear of the vehicle cabin has a large dimension in the vehicle front-rear direction.

BRIEF DESCRIPTION OF THE DRAWINGS

Exemplary embodiments of the present disclosure will be described in detail based on the following figures, wherein.

DETAILED DESCRIPTION

Explanation follows regarding a vehicle drive battery attachment structure 10 (referred to below simply as the "attachment structure 10") according to an exemplary embodiment of technology disclosed herein, with reference to FIG. 1 to FIG. 6. In each of the drawings, the arrow FR, the arrow LH, and the arrow UP respectively indicate the front direction (direction of travel), left direction, and upward direction of the vehicle, as appropriate. Unless specifically stated otherwise, reference in the following explanation simply to the front-rear, left-right, and up-down directions refers to the front and rear in the vehicle front-rear direction, left and right in the vehicle left-right direction (vehicle width direction), and up and down in the vehicle up-down direction.

Configuration

Figure 1:
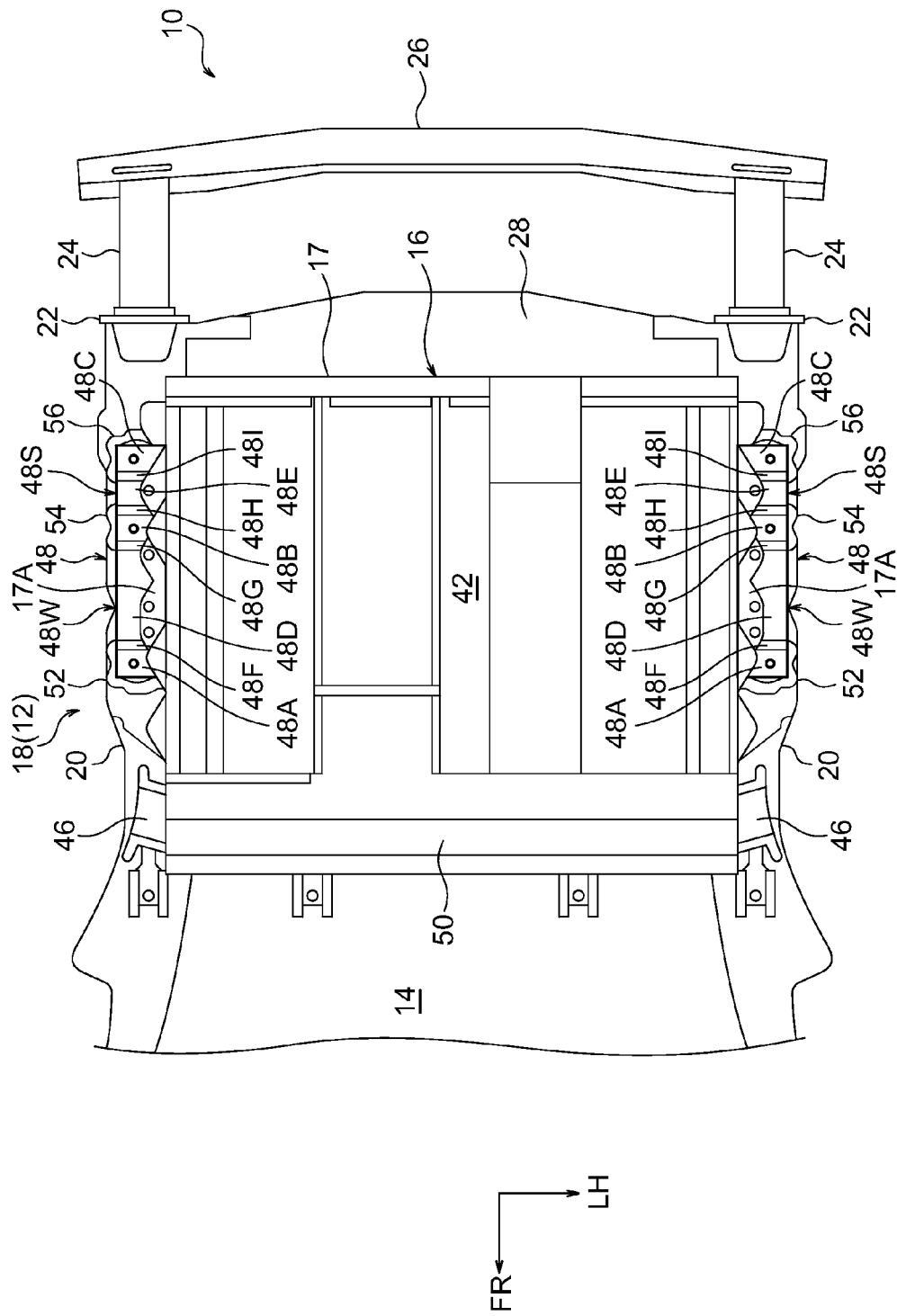
FIG. 1 is a plan view illustrating a partial configuration of a vehicle body rear section of a car applied with a vehicle drive battery attachment structure according to an exemplary embodiment of the present invention.
Figure 2:
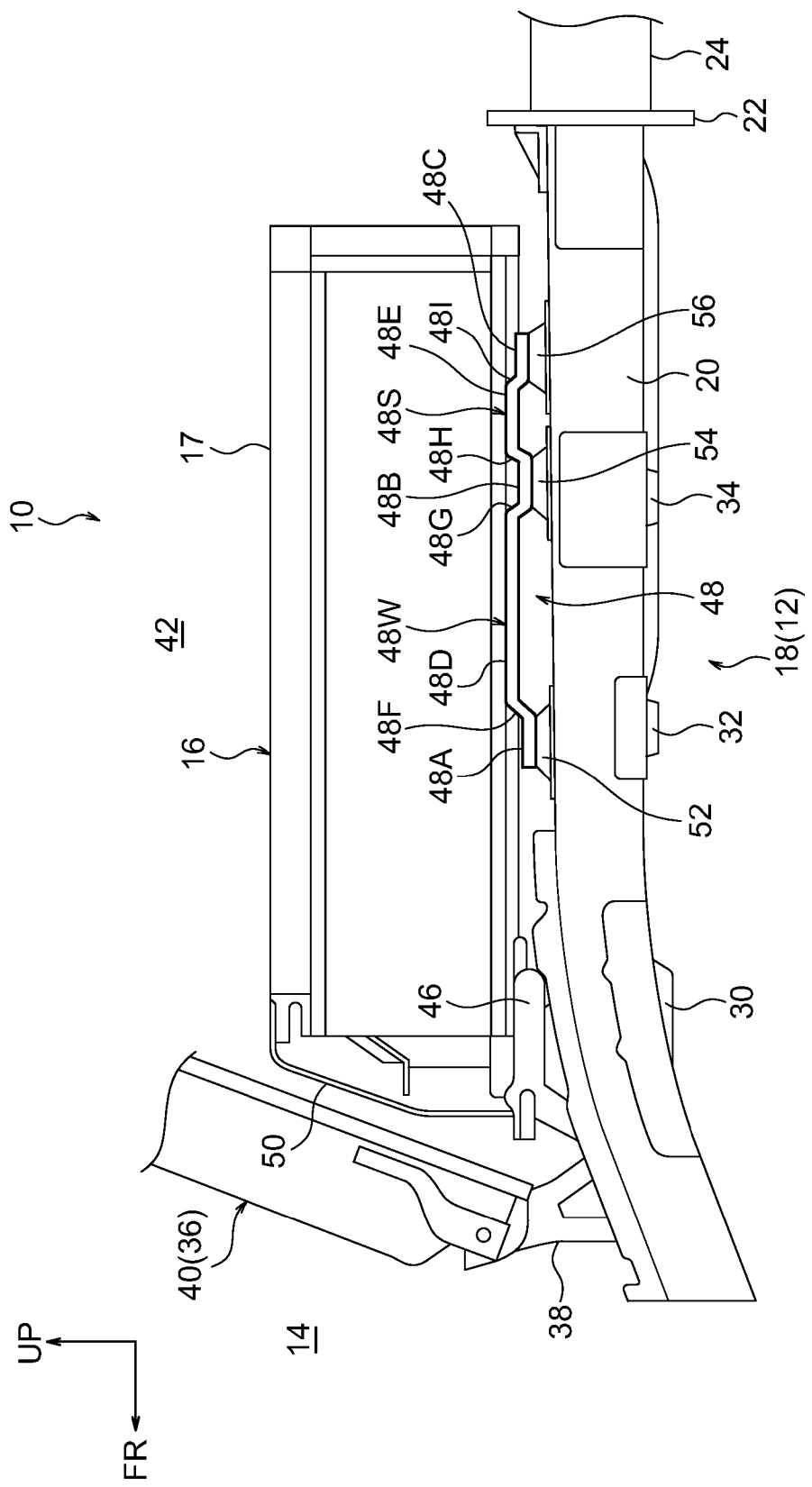
FIG. 2 is an enlarged side view illustrating the configuration shown in FIG. 1, in a state viewed from the left side of the vehicle.

As illustrated in FIG. 1 and FIG. 2, in the attachment structure 10 according to the present exemplary embodiment, a high capacity battery 16 that stores power to drive a car (vehicle) 12 is disposed (installed) at the vehicle rear of a cabin (vehicle cabin) 14 of the car 12. Although the car 12 is what is referred to as a plug-in hybrid vehicle, the attachment structure 10 may also be applied to an ordinary hybrid vehicle, an electric car, a fuel cell hybrid vehicle, or the like.

A pair of left and right rear side members 20 are disposed at both left and right side portions of a rear underbody 18 configuring a lower section of a vehicle body rear section of the car 12. The left and right rear side members 20 extend along the vehicle front-rear direction, and are each formed with a rectangular shaped closed cross-section profile as viewed along the vehicle front-rear direction. The left and right rear side members 20 are coupled together in the vehicle width direction by a cross member, not illustrated in the drawings. The cross member configures a vehicle body frame together with the left and right rear side members 20.

Lower back panels 22, each extending along the vehicle up-down direction and the vehicle width direction, are joined to rear end portions of the left and right rear side members 20, and respective crash boxes 24 are joined to the rear end portions of the left and right rear side members 20 through the lower back panels 22. Rear bumper reinforcement 26 extending along the vehicle width direction spans between rear end portions of the left and right crash boxes 24. A rear floor panel 28 extending along the vehicle front-rear direction and the vehicle width direction spans between upper end portions of the left and right rear side members 20.

Plural suspension brackets 30, 32, 34 (three in this example), respectively for attaching rear suspension, not illustrated in the drawings, are joined to lower portions of the left and right rear side members 20 at intervals in the vehicle front-rear direction. Side hinges 38 of rear seatbacks 36 provided to respective rear seats (back seats) are joined to upper faces of front end sides of the left and right rear side members 20. The side hinges 38 are disposed at left and right side portions of rear seatback frames 40 configuring frames of the respective rear seatbacks 36, and upper end portions of the respective side hinges 38 are coupled to lower end portions of the rear seatback frames 40.

A luggage space 42 is provided above the rear floor panel 28 at the vehicle rear of the rear seatbacks 36. The battery 16 mentioned above is disposed in the luggage space 42. The battery 16 includes a battery case 17 in a box shape formed with a low height dimension.

A dimension of the battery case 17 in the vehicle width direction is set slightly larger than a dimension between the left and right rear side members 20. As viewed from above the vehicle, both vehicle width direction end portions of the battery case 17 are formed so as to overlap slightly with the left and right rear side members 20. The battery case 17 is set with a large dimension in the vehicle front-rear direction, and is disposed in a region spanning from the vicinity of a front end portion to the vicinity of a rear end portion of the luggage space 42. Specifically, the vehicle front-rear direction dimension of the battery case 17 is set, for example, at 70% or more of a vehicle front-rear direction dimension of the luggage space 42 (a vehicle front-rear direction dimension spanning from lower end portions of the rear seatbacks 36 to the rear end portion of the rear floor panel 28). The strength and rigidity of the battery case 17 are set in anticipation of a collision load being input in a rear-end collision. A battery body (for example a lithium ion secondary battery), not illustrated in the drawings, is housed inside the battery case 17.

The battery case 17 is fastened and fixed to the upper faces of the left and right rear side members 20 through a pair of left and right front brackets 46 and a pair of left and right main brackets 48. The left and right front brackets 46 are, for example, formed by pressing metal plates, and are disposed between the upper faces of the left and right rear side members 20 and a lower face of a front end portion of the battery case 17. The front brackets 46 are joined to the upper faces of the left and right rear side members 20 by means such as spot welding or the like. The front end portion of the battery case 17 rests on upper faces of the left and right front brackets 46, and is fastened and fixed to the left and right front brackets 46 using nuts and bolts, not illustrated in the drawings. Note configuration is made such that when collision load toward the vehicle front side is input to the battery case 17, the left and right front brackets 46 undergo plastic deformation, thereby permitting displacement of the battery case 17 toward the vehicle front side.

A plate shaped cover 50, extending along the vehicle up-down direction and the vehicle width direction, is provided above the left and right front brackets 46, and between the battery case 17 and the rear seatbacks 36. An upper end portion of the cover 50 is fixed to the front end portion of the battery case 17 by means such as bolt fastening or the like, and a lower end portion of the cover 50 is fixed to front end portions of the left and right front brackets 46 by means such as bolt fastening or the like. The cover 50 covers the battery case 17 from the vehicle front side.

The main brackets 48 correspond to a "bracket" of technology disclosed herein, and are disposed above the left and right rear side members 20 at both vehicle width direction outsides of the battery case 17. The main brackets 48 are, for example, formed from metal in an elongated shape, and are disposed with their length direction orientated along the vehicle front-rear direction, and their thickness direction orientated along the vehicle up-down direction. The left and right main brackets 48 are each set with a vehicle front-rear direction dimension sufficiently smaller than that of the battery case 17 (around half in the present example), and are disposed toward a rear end portion of the battery case 17. Namely, the vehicle front-rear direction centers of the left and right main brackets 48 are positioned further to the vehicle rear side than the vehicle front-rear direction center of the battery case 17.

Figure 3:
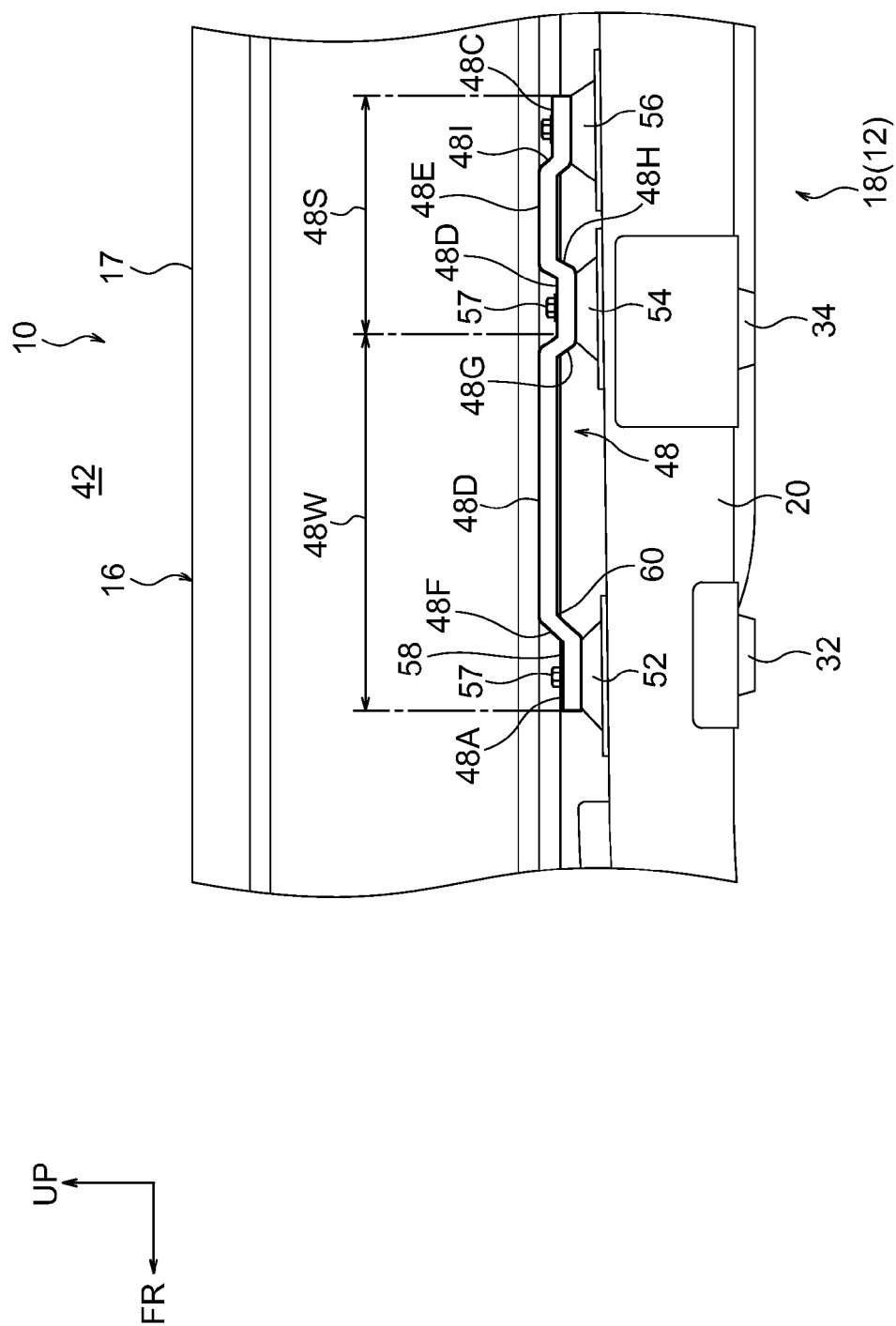
FIG. 3 is an enlarged side view illustrating an enlarged portion of FIG. 2.

As illustrated in FIG. 3, each of the main brackets 48 includes plural member-fastened portions 48A, 48B, 48C (three in the present example), disposed in a row at intervals along the vehicle front-rear direction, and plural case-fastened portions 48D, 48E (two in the present example) positioned between the member-fastened portions 48A, 48B, 48C in the vehicle front-rear direction. The member-fastened portions 48A, 48B, 48C and the case-fastened portions 48D, 48E are disposed substantially parallel to the upper faces of the rear side members 20.

Each main bracket 48 includes an inclined portion 48F that integrally connects together a rear end of the member-fastened portion 48A and a front end of the case-fastened portion 48D, an inclined portion 48G that integrally connects together a rear end of the case-fastened portion 48D and a front end of the member-fastened portion 48B, an inclined portion 48H that integrally connects together a rear end of the member-fastened portion 48B and a front end of the case-fastened portion 48E, and an inclined portion 48I that integrally connects together a rear end of the case-fastened portion 48E and a front end of the member-fastened portion 48C. The inclined portions 48F, 48H are inclined diagonally downward toward the vehicle front, and the inclined portions 48G, 48I are inclined diagonally downward toward the vehicle rear.

Each of the member-fastened portions 48A, 48B, 48C is set with equivalent vehicle front-rear direction dimensions. The front case-fastened portion 48D is set with a vehicle front-rear direction dimension sufficiently larger than that of the member-fastened portions 48A, 48B, 48C. The rear case-fastened portion 48E is set with a vehicle front-rear direction dimension sufficiently smaller than that of the front case-fastened portion 48D, and set with a vehicle front-rear direction dimension slightly larger than that of the member-fastened portions 48A, 48B, 48C. The inclined portions 48F, 48G, 48H, 48I are each set with a dimension along the direction of incline that is smaller than the vehicle front-rear direction dimensions of the member-fastened portions 48A, 48B, 48C. However, the inclined portion 48F positioned furthest to the front is set with a larger dimension along the direction of incline than the other inclined portions 48G, 48H, 48I. The dimensions of each portion of the main bracket 48 are not limited to the above, and may be modified as appropriate.

The case-fastened portions 48D, 48E correspond to a coupling flange 17A (not illustrated except for in FIG. 1) provided at a vehicle width direction outside end portion of the battery case 17. The coupling flange 17A projects out from a lower end portion of the battery case 17 toward the vehicle width direction outside, and is overlaid with vehicle width direction inside portions of upper faces of the case-fastened portions 48D, 48E. Plural nuts (not illustrated in the drawings) are screwed onto plural bolts (not allocated reference numerals) passing through the coupling flange 17A and the case-fastened portions 48D, 48E, thereby fastening and fixing the coupling flange 17A, namely, the battery case 17, to the case-fastened portions 48D, 48E. Note that in the present exemplary embodiment, the front case-fastened portion 48D is fastened and fixed to the coupling flange 17A by three respective bolts and nuts in a row along the vehicle front-rear direction, and the rear case-fastened portion 48E is fastened and fixed to the coupling flange 17A by a single bolt and nut respectively.

The member-fastened portions 48A, 48B, 48C correspond to fixing mounts 52, 54, 56 provided at the upper face of the rear side member 20. The fixing mounts 52, 54, 56 configure part of the rear side member 20. The respective fixing mounts 52, 54, 56 are formed in hat shapes pressed from sheet metal, for example, and are disposed below the respective member-fastened portions 48A, 48B, 48C. The frontmost fixing mount 52 and member-fastened portion 48A are positioned above the suspension bracket 32, and the fixing mount 54 and the member-fastened portion 48B second from the front (and second from the rear in this example) are disposed above the suspension bracket 34.

Flanges provided at lower end portions of the respective fixing mounts 52, 54, 56 are joined to the upper face of the rear side member 20 by means such as spot welding or the like. The member-fastened portions 48A, 48B, 48C are each overlaid with and rest on upper faces of the fixing mounts 52, 54, 56. Nuts (not illustrated in the drawings) are screwed onto bolts 57 (reference numerals are omitted except for in FIG. 3: omitted from illustration in FIG. 2, and FIG. 4 to FIG. 6) that penetrate the respective member-fastened portions 48A, 48B, 48C and the respective fixing mounts 52, 54, 56, thereby fastening and fixing the member-fastened portions 48A, 48B, 48C to the fixing mounts 52, 54, 56, namely, to the rear side member 20. Namely, the main bracket 48 is fastened and fixed to the rear side member 20 at three fastening points in a row, at intervals in the vehicle front-rear direction.

In the present exemplary embodiment, the fixing mounts 52, 54, 56 are understood as part of the rear side member 20; however there is no limitation thereto, and the fixing mounts 52, 54, 56 may be understood as part of the "bracket" according to technology disclosed herein. Namely, the "bracket" according to technology disclosed herein may be understood as being configured from the main bracket 48 and the fixing mounts 52, 54, 56.

Figure 4:
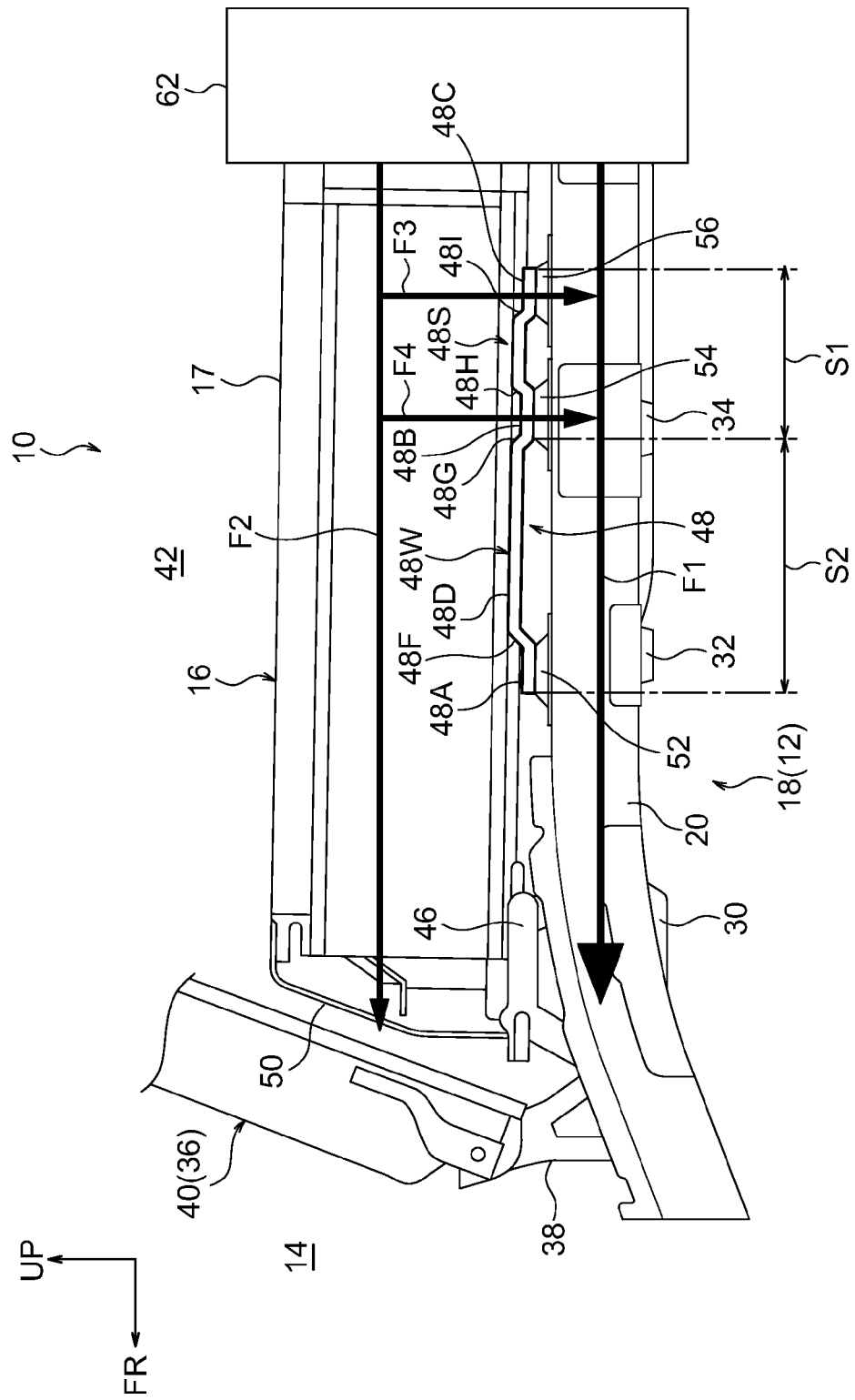
FIG. 4 is a side view corresponding to FIG. 2 to explain input routes of collision load when a barrier has rear-ended the car.
Figure 5:
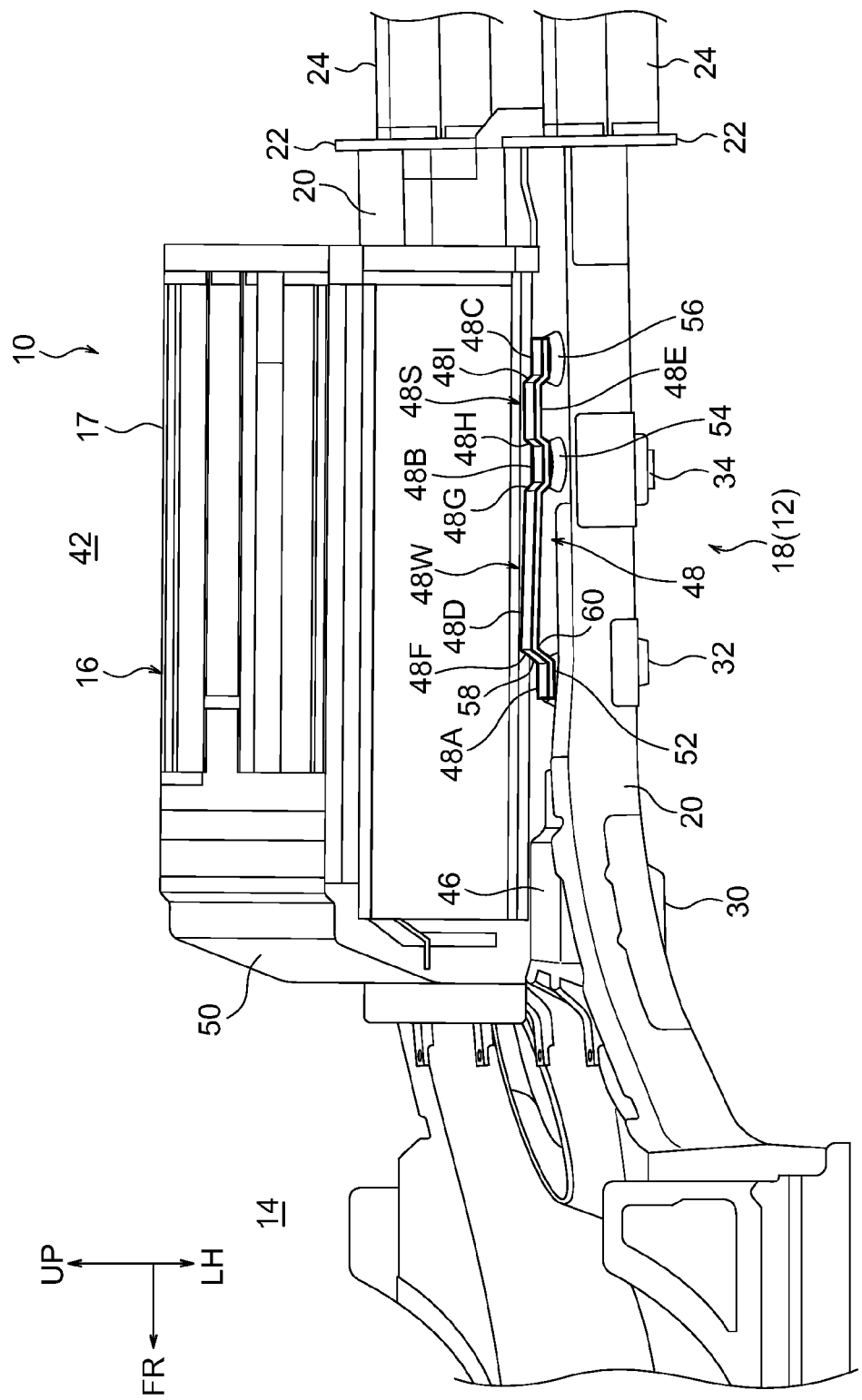
FIG. 5 is a perspective view illustrating the configuration shown in FIG. 2, in a state viewed from the vehicle left and at a slight angle to the upper side.

In the main bracket 48 configured as described above, a location positioned in the section labelled S1 in FIG. 4 configures a high strength portion 48S, and a location positioned in the section labelled S2 in FIG. 4 configures a low strength portion 48W. Namely, S1 indicates a section where the high strength portion 48S is disposed, and S2 indicates a section where the low strength portion 48W is disposed. The high strength portion 48S is disposed at the vehicle rear of the low strength portion 48W, and the low strength portion 48W is set with a larger dimension in the vehicle front-rear direction than the high strength portion 48S. The main bracket 48 is fastened and fixed to the rear side member 20 at both vehicle front-rear direction end sides of the respective high strength portions 48S, 48W, namely, at both vehicle front-rear direction end sides of the low strength portion 48W, and at both vehicle front-rear direction end sides of the of the high strength portion 48S.

The low strength portion 48W is configured by the member-fastened portion 48A, the inclined portions 48F, 48G, and the case-fastened portion 48D. The high strength portion 48S is configured by the member-fastened portions 48B, 48C, the inclined portions 48H, 48I, and the case-fastened portion 48E. The low strength portion 48W is set with lower strength with respect to load (compression load) in the vehicle front-rear direction than the high strength portion 48S.

Specifically, the low strength portion 48W includes the inclined portion 48F positioned furthest to the front. As described above, the inclined portion 48F is set with a larger dimension along its incline direction than the other inclined portions 48G, 48H, 48I. Accordingly, stress is concentrated at a bent portion 58 (see FIG. 3, FIG. 5, FIG. 6) formed between the inclined portion 48F and the member-fastened portion 48A, and at a bent portion 60 (see FIG. 3, FIG. 5, FIG. 6) formed between the inclined portion 48F and the case-fastened portion 48D when vehicle front-rear direction load acts on the main bracket 48. As a result, configuration is such that the low strength portion 48W deforms about origins at the bent portions 58, 60. Namely, the bent portions 58, 60 configure deformation origin portions (weakened portions) of the low strength portion 48W.

Note that in the present exemplary embodiment, the bent portions 58, 60 provided to the low strength portion 48W configure the deformation origin portions of the low strength portion 48W; however, technology disclosed herein is not limited thereto. For example, deformation origin portions may be set in the low strength portion 48W by forming holes, cutaways, grooves, notches, ridges or the like, and the configuration of the deformation origin portions may be modified as appropriate.

In the present exemplary embodiment, the suspension brackets 32, 34 are joined to the lower portions of the left and right rear side members 20, and the rear suspension, not illustrated in the drawings, is attached to the suspension brackets 32, 34, in the sections S1, S2 described above. Due to the relationship between the rear suspension and the suspension brackets 32, 34, the left and right rear side members 20 deform more readily under vehicle front-rear direction load at a location positioned in the section S2 where the low strength portion 48W is disposed than at a location positioned in the section 51 where the high strength portion 48S is disposed. Note that configuration may be made to weaken the location of the left and right rear side members 20 positioned in the section S2 by setting a deformation origin portion configured by press holes or the like at this location.

Operation and Advantageous Effects

Next, explanation follows regarding operation and advantageous effects of the present exemplary embodiment.

In the attachment structure 10 configured as described above, the battery 16 that drives the car 12 is disposed at the vehicle rear of the cabin 14 of the car 12. The battery case 17 of the battery 16 is set with a large dimension in the vehicle front-rear direction, and is disposed over a broad region spanning from the vicinity of the front end portion to the vicinity of the rear end portion of the luggage space 42. As illustrated in FIG. 4, when the car 12 is involved in a rear-end collision, not only is collision load Fl input to the left and right rear side members 20, but collision load F2 is sometimes input directly to the battery 16. Note that FIG. 4 illustrates a state in which the car 12 has been rear-ended by a crash test barrier 62 (not illustrated, with the exception of in FIG. 4).

Figure 6:
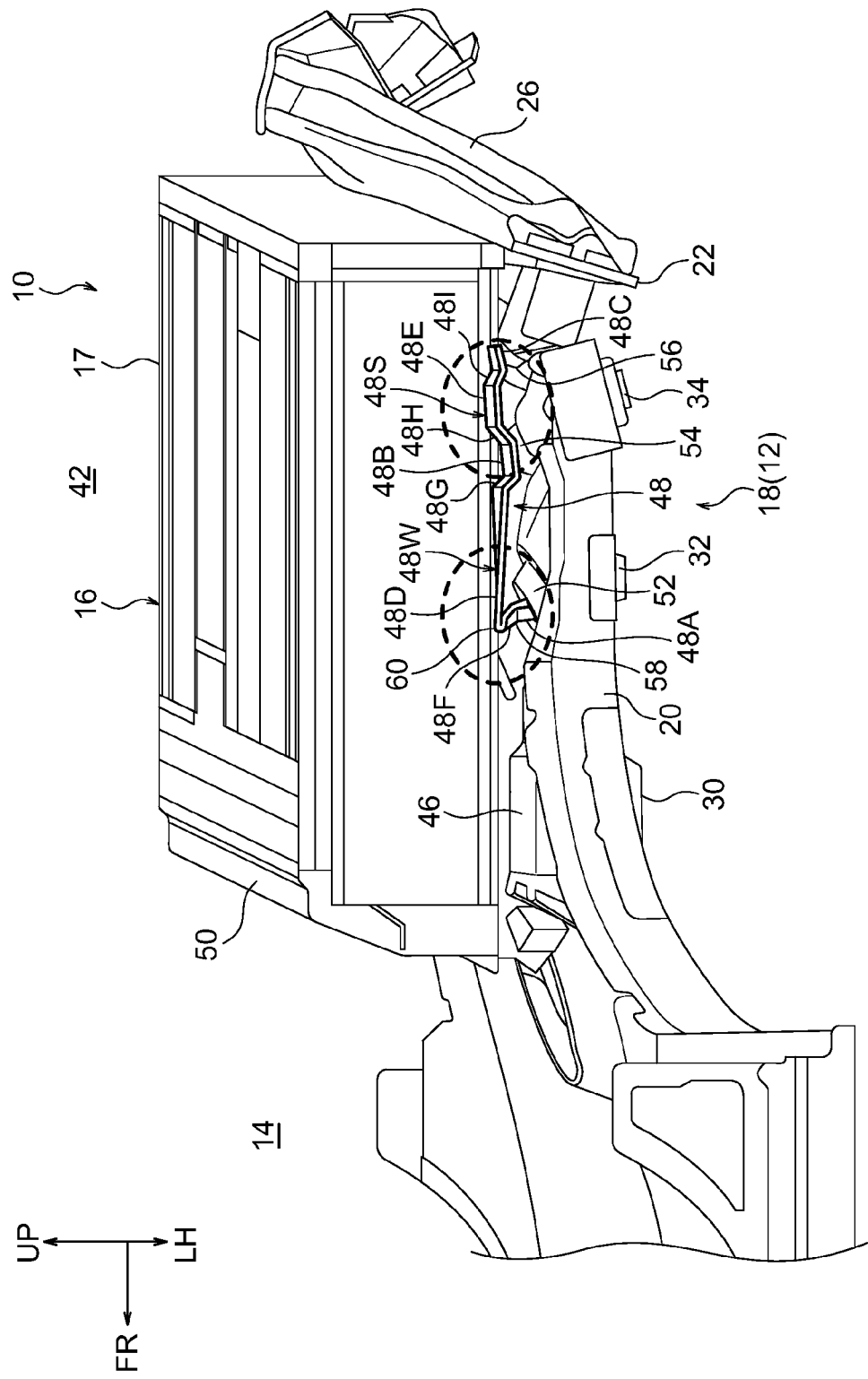
FIG. 6 is a perspective view corresponding to FIG. 5, illustrating a state in which the vehicle body rear section of the car has deformed in a rear-end collision with the barrier shown in FIG. 4.

In such a case, some of the collision load F2 input to the battery 16 is transmitted to the rear side member 20 through the high strength portion 48S provided to the main bracket 48 (see arrows F3, F4 in FIG. 4). This thereby enables a reduction in the input to the battery 16. Moreover, when the low strength portion 48W provided to the main bracket 48 deforms about origins at the bent portions 58, 60 due to the input to the battery 16, as illustrated in FIG. 6, the left and right rear side members 20 readily deform in the vehicle front-rear direction in the section S2 that runs along the vehicle front-rear direction where the low strength portion 48W is disposed. This thereby permits vehicle front-rear direction deformation (axial compression deformation) of the rear side members 20 in the section S2, thus contributing to securing crash stroke. Moreover, the high strength portion 48S can suppress displacement of the battery 16 toward the vehicle front side with respect to the vehicle body, thus contributing to a reduction in the deformation amount of the cabin 14, enabling survival space for occupants of the rear seats to be secured.

To elaborate further on the above advantageous effect, were the entire main bracket 48 to be set with high strength, for example, the rear side members 20 would not readily deform in the vehicle front-rear direction section where the battery 16 is disposed, thereby reducing the crash stroke. In such cases, it would be necessary to reinforce the rear side members 20 and the rear end (the crash boxes 24, the rear bumper reinforcement 26 and the like) in order to suppress deformation of the cabin 14.

Were the entire main bracket 48 to be set with high strength, the main bracket 48 itself would not readily deform, and the collision load F2 from the barrier 62 would be transmitted from the battery 16 to the cabin 14. In such cases, it would be necessary to reinforce the battery 16 and/or the cabin 14 due to increased input to the battery 16 and increased input to the cabin 14. Such factors would lead to increases in the manufacturing cost and weight of the car 12. However, the present exemplary embodiment is able to avoid such issues.

Moreover were, for example, the entire main bracket 48 to be set with low strength, the main bracket 48 would undergo heavy deformation due to the collision load F2 input to the battery 16, thereby increasing the displacement amount of the battery 16 toward the vehicle front. As a result, there would be a chance that the battery 16 could impinge on the rear seatbacks 36 from the vehicle rear, giving rise to issues from the perspective of securing survival space for occupants of the rear seats.

Regarding this point, in the present exemplary embodiment the low strength portion 48W, this being part of the main bracket 48, deforms, moving the battery 16 toward the front so as to secure the crash stroke, while the high strength portion 48S that is part of the main bracket 48 suppresses displacement of the battery 16 toward the vehicle front side with respect to the vehicle body. This thereby enables a survival space for occupants of the rear seats to be well secured.

In the present exemplary embodiment, in the vehicle front-rear direction, each rear side member 20 deforms more readily under vehicle front-rear direction load at the location positioned in the section S2 where the low strength portion 48W of the main bracket 48 is disposed than at the location positioned in the section S1 where the high strength portion 48S of the main bracket 48 is disposed. This thereby enables efficient deformation of the rear side members 20 in the section S2 running in the vehicle front-rear direction where the low strength portion 48W is disposed during deformation of the low strength portion 48W.

Moreover, deformation of the rear side member 20 can be suppressed in the section S1 that runs along the vehicle front-rear direction where the high strength portion 48S is disposed. Input to the battery 16 can thus be efficiently transmitted through the high strength portion 48S to the rear side members 20, thereby enabling input to the battery 16 to be efficiently reduced.

In the present exemplary embodiment, the high strength portion 48S of each main bracket 48 is disposed at the vehicle rear of the low strength portion 48W. This thereby enables the collision loads F3, F4 transmitted through the high strength portion 48S to the rear side member 20 to be efficiently utilized in deformation of the rear side member 20 in the section S2 that runs along the vehicle front-rear direction where the low strength portion 48W is disposed. This thereby enables efficient deformation of the rear side member 20.

In the present exemplary embodiment, each of the main brackets 48 is set with a smaller vehicle front-rear direction dimension than that of the battery 16, thereby enabling an increase in weight to be suppressed. Moreover, the main brackets 48 are disposed toward the rear end portion of the battery 16, thereby enabling both the section S1 where the collision load F2 input to the rear end portion of the battery 16 is transmitted through the high strength portion 48S of the main bracket 48 to the rear side member 20, and the section S2 where the rear side member 20 is deformed together with the low strength portion 48W, to be set further toward the rear side of the vehicle (at a side further away from the cabin 14). This thereby enables, for example, energy absorption by deformation of the rear side member 20 in the section S2 to be suppressed from affecting the cabin 14.

The low strength portion 48W is set with a larger vehicle front-rear direction dimension than the high strength portion 48S, thereby enabling the section S1 where the rear side member 20 does not readily deform to be made smaller, and enabling the section S2 where the rear side member 20 deforms readily to be made larger. This contributes to increasing the crash stroke.

Supplementary Explanation of the Exemplary Embodiment

In the exemplary embodiment described above, the deformation stroke of the main bracket 48 along the vehicle front-rear direction in a rear-end collision of the car 12 may be set equivalent to the vehicle front-rear direction dimension of a gap between the battery 16 and the rear seatbacks 36, or lower. This thereby enables the battery 16 to be prevented or suppressed from impinging on the rear seatbacks 36 in a rear-end collision, thereby making a further contribution to securing survival space for occupants of the rear seats.

In the exemplary embodiment described above, each main bracket 48, serving as a bracket of technology disclosed herein, is provided with a single low strength portion 48W and a single high strength portion 48S. However, the present invention is not limited thereto, and the bracket may be provided with plural of one or both out of the low strength portion and the high strength portion. Namely, the bracket according to technology disclosed herein may be fixed to the rear side member at three or more fixing points (for example fastening points using nuts and bolts) in a row at intervals along the vehicle front-rear direction, with at least one section having reduced (or increased) strength with respect to other sections out of plural sections partitioned along the vehicle front-rear direction at the three or more fixing points or in the vicinities thereof.

In the exemplary embodiment described above, each main bracket 48, serving as a bracket according to technology disclosed herein, is fastened and fixed to the upper face of the corresponding rear side member 20; however, technology disclosed herein is not limited thereto. Namely, in cases in which a battery is disposed between left and right rear side members, for example, left and right brackets fixed to left and right side portions of the battery may be fixed to side faces on the vehicle width direction insides of the left and right rear side members.

Various other modifications may be implemented within a range not departing from the spirit of technology disclosed herein. Obviously, the scope of rights encompassed by the technology disclosed herein is not limited by the exemplary embodiment described above.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle drive battery attachment structure, comprising:
    a battery case disposed at a vehicle rear of a vehicle cabin;
    a rear side member that is provided at a side portion of a vehicle body rear section and that extends along a vehicle front-rear direction; and
    a bracket that is fixed to the battery case, that includes a low strength portion and a high strength portion in a row along the vehicle front-rear direction, the bracket is fixed to the rear side member at both vehicle front-rear direction end sides of the low strength portion and the high strength portion, respectively, the low strength portion and the high strength portion are directly secured to the battery case and in which the low strength portion is set with lower strength with respect to a vehicle front-rear direction load than the high strength portion.

2. The vehicle drive battery attachment structure of claim 1, wherein in the vehicle front-rear direction, the rear side member deforms more readily under a vehicle front-rear direction load at a location positioned in a section where the low strength portion is disposed than at a location positioned in a section where the high strength portion is disposed.

3. The vehicle drive battery attachment structure of claim 1, wherein the bracket includes the high strength portion disposed to the vehicle rear of the low strength portion.

4. The vehicle drive battery attachment structure of claim 1, wherein the bracket is set with a smaller vehicle front-rear direction dimension than the battery case, and is disposed toward a rear end portion of the battery case.

5. The vehicle drive battery attachment structure of claim 1, wherein the low strength portion is set with a larger vehicle front-rear direction dimension than the high strength portion.

6. The vehicle drive battery attachment structure of claim 1, wherein the low strength portion includes bent portions that function as deformation origin portions that deform by stress generated when a vehicle front-rear direction load acts on the bracket.

7. The vehicle drive battery attachment structure of claim 1, wherein a deformation stroke of the bracket along vehicle front-rear direction in a rear-end collision of the vehicle is set equivalent to a vehicle front-rear direction dimension of a gap between the battery case and a rear seatback, or lower,
    wherein the deformation stroke is an amount of deformation of the bracket during the collision.

* * * * *